United States Patent
Johnson et al.

(10) Patent No.: US 8,869,940 B2
(45) Date of Patent: Oct. 28, 2014

(54) DUAL TEMPERATURE OIL CONTROL SYSTEM AND METHOD FOR A WIND TURBINE GEARBOX

(75) Inventors: Stephen Bertram Johnson, Greenville, SC (US); Priyangu Chunilal Patel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 13/351,471

(22) Filed: Jan. 17, 2012

(65) Prior Publication Data

US 2013/0183138 A1    Jul. 18, 2013

(51) Int. Cl.
*F03D 11/00* (2006.01)

(52) U.S. Cl.
USPC .......................................... 184/6.12

(58) Field of Classification Search
CPC .... F01M 5/002; F01M 5/005; F03D 11/0008; F16H 57/0412; F16H 57/04; F16N 7/40; F16N 39/02; Y02E 10/772
USPC ........................ 184/6.12, 6.4, 6.22; 415/110
See application file for complete search history.

(56) References Cited

U.S. PATENT DOCUMENTS

| | | | |
|---|---|---|---|
| 3,480,076 A | 11/1969 | Tomita | |
| 4,368,692 A | 1/1983 | Kita | |
| 4,512,300 A | 4/1985 | DeVore et al. | |
| 4,671,229 A | 6/1987 | Barnes | |
| 4,994,700 A | 2/1991 | Bansal et al. | |
| 5,147,015 A | 9/1992 | Snuttjer et al. | |
| 5,186,277 A | 2/1993 | Snuttjer et al. | |
| 5,318,151 A * | 6/1994 | Hood et al. | ..... 184/6.1 |
| 5,545,974 A | 8/1996 | Trainor et al. | |
| 6,240,916 B1 | 6/2001 | Huang | |
| 6,871,703 B2 * | 3/2005 | Kemmerer et al. | ..... 165/297 |
| 6,877,948 B2 | 4/2005 | Cutcher | |
| 6,969,926 B2 | 11/2005 | Conlon | |
| 7,453,164 B2 | 11/2008 | Borden et al. | |
| 7,908,840 B2 * | 3/2011 | Schwarz et al. | ..... 60/39.08 |
| 7,988,364 B2 | 8/2011 | Versteegh et al. | |
| 8,100,106 B2 * | 1/2012 | Kardos et al. | ..... 123/196 AB |
| 2005/0034925 A1 * | 2/2005 | Flamang et al. | ..... 184/6.12 |
| 2005/0161950 A1 | 7/2005 | Borden et al. | |
| 2006/0119106 A9 | 6/2006 | Borden et al. | |
| 2006/0188364 A1 | 8/2006 | Fritz | |
| 2008/0272605 A1 | 11/2008 | Borden et al. | |
| 2009/0200114 A1 * | 8/2009 | Bagepalli et al. | ..... 184/6.22 |
| 2010/0014791 A1 | 1/2010 | Versteegh et al. | |

(Continued)

FOREIGN PATENT DOCUMENTS

| EP | 0 431 256 A1 | 6/1991 |
|---|---|---|
| EP | 0 431 256 B1 | 6/1991 |

(Continued)

*Primary Examiner* — William E Dondero
*Assistant Examiner* — Michael Riegelman
(74) *Attorney, Agent, or Firm* — Dority & Manning, P.A.

(57) ABSTRACT

A system and method are provided for supplying oil at different temperatures to different locations within a wind turbine gearbox, wherein oil is pumped from a common oil sump to the different locations via a common header. The different gear box locations are divided into at least two groups, wherein each of said groups receives inlet oil at a respective inlet oil temperature. A first temperature control device is disposed between the common header and the first group, and a second temperature control device is disposed between the common header and the second group of gearbox locations.

8 Claims, 5 Drawing Sheets

(56) References Cited

U.S. PATENT DOCUMENTS

| | | |
|---|---|---|
| 2010/0066088 A1 | 3/2010 | Matsushita |
| 2010/0104439 A1 | 4/2010 | Nomaguchi et al. |
| 2010/0109334 A1 | 5/2010 | Nies |
| 2010/0124507 A1 | 5/2010 | Wallace et al. |
| 2010/0135793 A1* | 6/2010 | Krauss ............... 416/1 |
| 2010/0164228 A1 | 7/2010 | Matsuo et al. |
| 2010/0329869 A1 | 12/2010 | Okano |
| 2011/0012353 A1 | 1/2011 | Kamata et al. |
| 2011/0024236 A1* | 2/2011 | Yano et al. .......... 184/6.12 |
| 2011/0168494 A1 | 7/2011 | Subramaniam et al. |
| 2011/0168495 A1* | 7/2011 | Subramaniam et al. ..... 184/6.12 |
| 2011/0222804 A1 | 9/2011 | Okano et al. |
| 2012/0211307 A1* | 8/2012 | Nielsen ............. 184/4 |
| 2012/0241258 A1* | 9/2012 | Subramaniam et al. ....... 184/6.4 |
| 2012/0243998 A1* | 9/2012 | Becker et al. ............. 416/169 R |
| 2012/0256426 A1* | 10/2012 | Klein et al. .................... 290/1 C |
| 2013/0075198 A1* | 3/2013 | Uusitalo et al. .............. 184/6.12 |
| 2013/0288843 A1* | 10/2013 | Baum et al. ................... 475/160 |

FOREIGN PATENT DOCUMENTS

| | | |
|---|---|---|
| EP | 1 653 062 A1 | 5/2006 |
| EP | 2 148 089 A1 | 1/2010 |
| EP | 2 184 486 A2 | 5/2010 |
| EP | 2 295 796 A1 | 3/2011 |
| EP | 2 325 486 A1 | 5/2011 |
| EP | 2 357 360 A1 | 8/2011 |

* cited by examiner

DUAL TEMPERATURE OIL CONTROL SYSTEM AND METHOD FOR A WIND TURBINE GEARBOX

FIELD OF THE INVENTION

The present subject matter relates generally to wind turbines and, more particularly, to a system and method for controlling the oil temperature in multi-stage wind turbine gearboxes.

BACKGROUND OF THE INVENTION

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor.

The gearbox in a wind turbine is used to transform the relatively low RPM/high torque input from the rotor into a high RPM/lower torque input to the generator. Multi-stage gearboxes are generally used to achieve overall gear ratios greater than 100:1. Typically, all stages of these multi-stage gearboxes are supplied with oil from a common lubrication system wherein a pump draws oil from a sump and directs the oil through a filtration system. The oil is then cooled in a heat exchanger (cooler) to reduce the temperature of the oil to a desired gearbox oil inlet temperature. This inlet temperature is generally a compromise between the optimum oil temperatures for the various gear mesh spray and bearing components across the multiple gearbox stages. Because the optimum inlet oil temperature cannot be achieved for all of the stages, the gearing and bearing components for at least certain of the stages must be designed to compensate (e.g., oversized in some cases) for the less-than-optimum oil temperature in order to ensure the design life of the gearbox.

Accordingly, an oil temperature system and control method that provides inlet oil to the various stages of a multi-stage gearbox at temperatures set for the individual stages would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter discloses a system for supplying oil at different temperatures to different locations within a wind turbine gearbox so as to supply the oil at a temperature that is tailored for the different specific locations. The system includes a common oil sump and a supply pump disposed to draw oil from the sump and deliver the oil to the different gearbox locations via a common header, which may be defined by any number and configuration of supply lines and components.

In a particular embodiment, the different gear box locations are divided into at least two groups, wherein each of the groups receives inlet oil at a respective inlet oil temperature (T1 and T2). A first temperature control device is disposed between the common header and first group, and a second temperature control device is disposed between the common header and the second group. These temperature control devices may be, for example, any configuration of mixing valves, flow control valves, and so forth. In a particular embodiment, mixing valves are configured to independently control the inlet oil temperature to the respective groups within the wind turbine gearbox. The mixing valves may be passive devices with a self-contained temperature sensor and a pre-set control temperature. In other embodiments, the mixing valves may be actively controlled, for example by a controller. In yet other embodiments, the temperature control devices may be flow control valves.

In one embodiment, the system includes an oil cooler disposed in the common header, with the first and second temperature control devices disposed downstream of the cooler so as to vary the flow of oil from the common cooler to the respective first and second groups of gearbox locations to control inlet oil temperature at the locations. As mentioned, the temperature control devices may be mixing valves having a first inlet from the cooler, and a second inlet from a cooler bypass line, wherein the inlet oil temperature to the different groups is controlled by varying the degree of mixing of cooled oil from the cooler and uncooled oil from the bypass line.

In a certain embodiment, the temperature control devices may be mixing valves that are independently operated by a controller in response to a first inlet oil temperature-based sensor configured with the first group and first control valve, and a second inlet oil temperature-based sensor configured with the second group and second control valve.

The first and second groups of gearbox locations may be variously defined. For example, in one embodiment, the first and second groups may comprise components of separate gear stages in the wind turbine gearbox. This embodiment may include, for example, a first group with components in a first gear stage and a second gear stage of the wind turbine gearbox, and a second group with components in a third gear stage of the wind turbine gearbox.

In a different embodiment, the first and second groups of gearbox locations may include components within the same gear stage of the wind turbine gearbox.

The present invention also encompasses various control method embodiments for supplying oil at different temperatures to different locations within a wind turbine gearbox. One such method may include, for example, supplying oil from a common header and common oil cooler to a plurality of different locations in the wind turbine gearbox. An inlet oil temperature-based parameter (such as temperature compensated viscosity) is monitored at the different locations. The temperature of the oil supplied to the different locations is independently controlled as a function of the monitored inlet oil temperature-based parameter by independently varying the flow of cooled oil from the common oil cooler to each of the different locations.

A particular method embodiment may include controlling the flow of cooled oil with temperature control devices associated with each of the different locations. This may include controlling the mixing of cooled oil and uncooled oil supplied to the different locations with the temperature control devices to provide inlet oil at different temperatures to the different locations.

The control method may define the various groups of gearbox locations in different ways. For example, the plurality of gearbox locations may be divided into a first group of one or more gear stages supplied with a first inlet oil temperature, and a second group of one or more different gear stages supplied with a second inlet oil temperature. In an alternate embodiment, the plurality of gearbox locations may be divided into a first group of components in a gear stage supplied with a first inlet oil temperature, and a second group of components in the same gear stage supplied with a second inlet oil temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a system and/or methods for supplying oil at different temperatures to different locations within a gearbox of a wind turbine. In one aspect, the invention seeks to better optimize performance and reliability of a multi-stage gearbox, particularly the higher speed stages, without adding significantly to the overall cost and complexity of the oil delivery system. The present invention recognizes that, for example, a more optimized oil viscosity should result in more reliable higher speed gear stages. For example, the third stage of a multi-stage gearbox could be supplied with oil at 70° Celsius to minimize oil losses, while the first and second stages could be feed with oil at 50° Celsius to increase the mesh oil film thickness between gear teeth.

The present invention thus seeks to better match different desired oil viscosities at different locations within the wind turbine gearbox to supply a desired oil film thickness for gears and components at the different gear stages. In addition to better wear resistance of the gearbox components, there may also be a significant increase in the scuffing capacity. For example, at a low speed/high torque first gear stage of a multi-stage gearbox, a reduction of inlet oil temperature from 70° Celsius to 55° Celsius can increase the safety margin against scuffing (flash temperature) by 25%.

Figure 1:
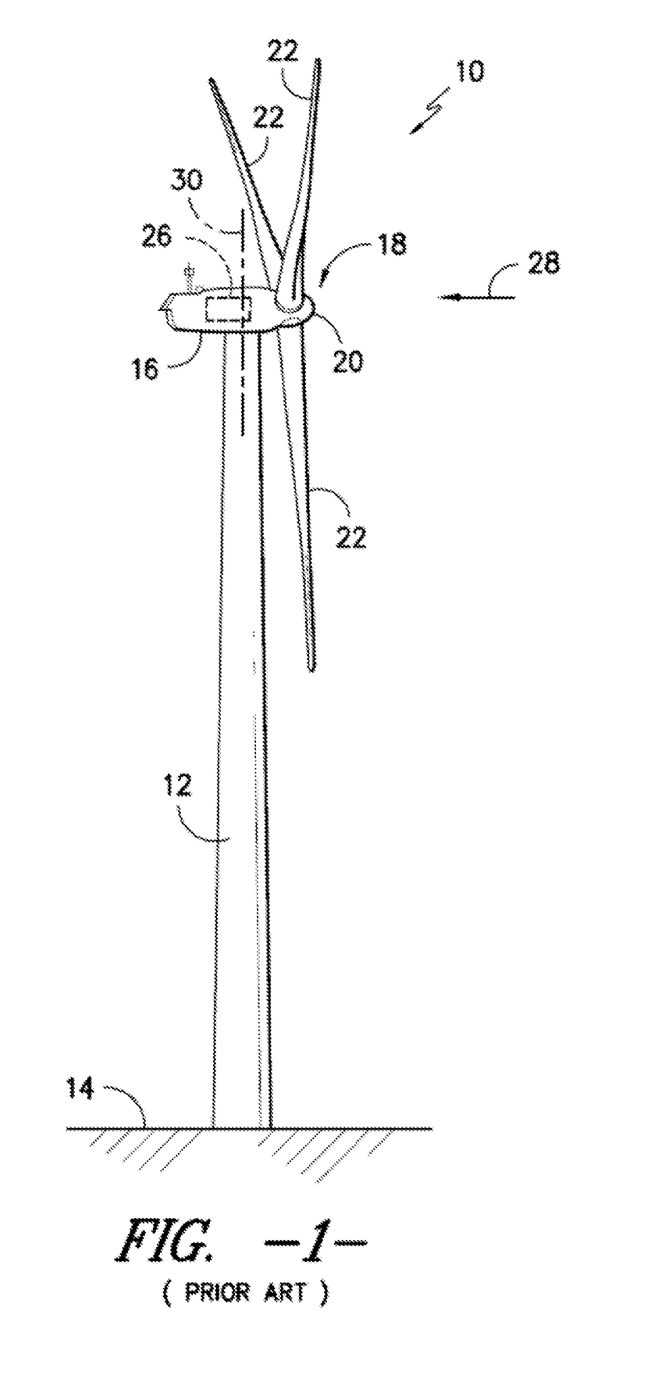
FIG. 1 illustrates a perspective view of one embodiment of a wind turbine of conventional construction.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the load and power output generated by the wind turbine 10 by adjusting an angular position of at least one rotor blade 22 relative to the wind. For instance, the turbine controller 26 may control the pitch angle of the rotor blades 22, either individually or simultaneously, by transmitting suitable control signals/commands to a pitch drive or pitch adjustment mechanism (not shown) of the wind turbine 10. Further, as the direction 28 of the wind changes, the turbine controller 26 may be configured to control a yaw direction of the nacelle 16 about a yaw axis 30 to position the rotor blades 22 with respect to the direction 28 of the wind, thereby controlling the load and power output generated by the wind turbine 10. For example, the turbine controller 26 may be configured to transmit control signals/commands to a yaw drive mechanism (not shown) of the wind turbine 10 such that the nacelle 16 may be rotated about the yaw axis 30.

Figure 2:
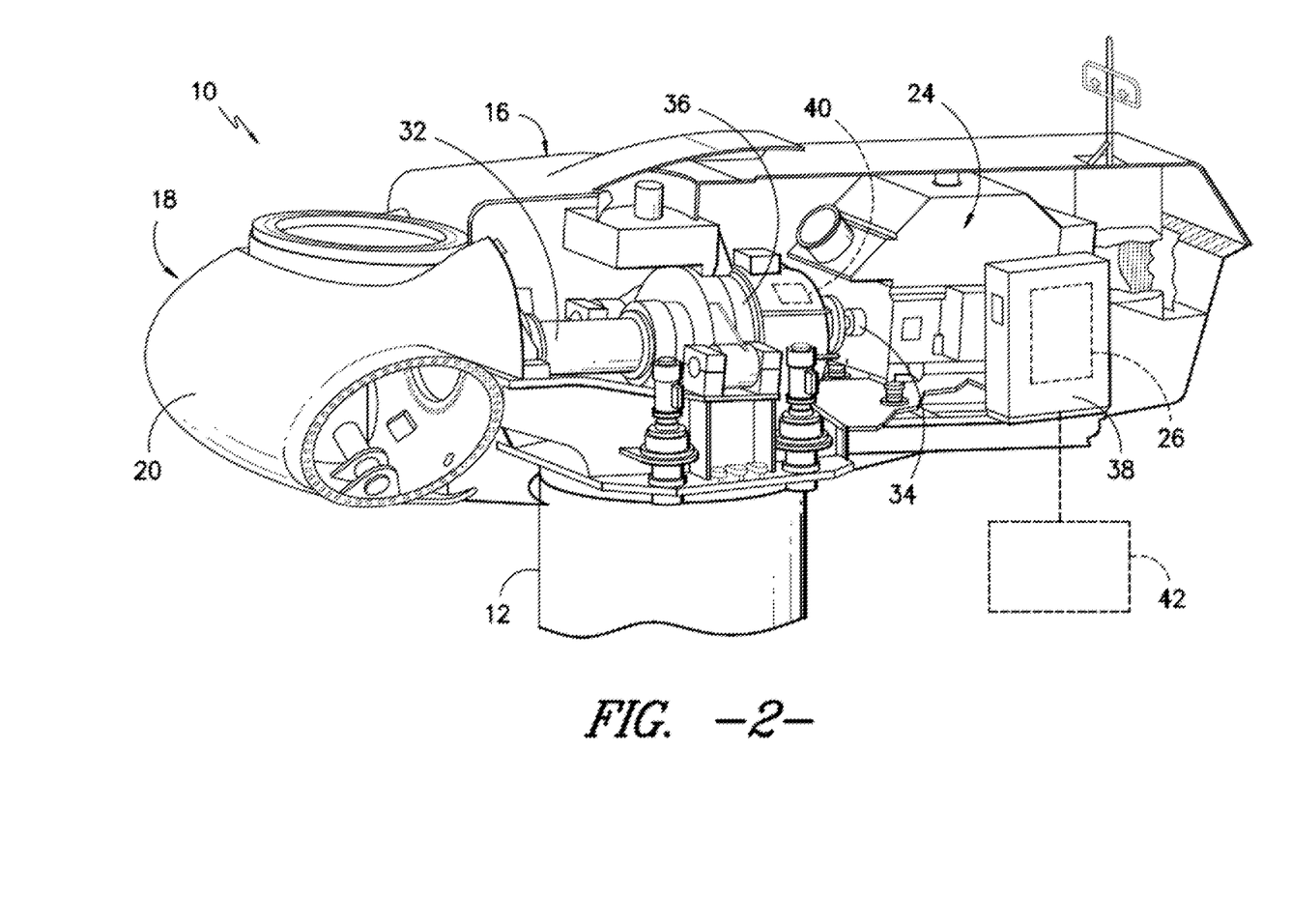
FIG. 2 illustrates a perspective, interior view of one embodiment of a nacelle of a wind turbine.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36, which may be a three-stage gearbox. As is generally understood, the rotor shaft 32 may provide a low speed, high torque input to the first stage of the gearbox 36 in response to rotation of the rotor blades 22 and the hub 20. The gearbox 36 may then be configured to convert the low speed (e.g., 15 RPM), high torque input in downstream stages to a high speed (e.g., 1500 RPM), low torque output from a final stage to drive the generator shaft 34 and, thus, the generator 24.

It should be appreciated that the gearbox 36 may generally comprise any suitable gearbox known in the art. For instance, in one embodiment, the gearbox 36 may comprise a planetary gearbox including a plurality of gears (e.g., planetary, ring and/or sun gears) and bearings (not shown) for converting the low speed, high torque input of the rotor shaft 32 to a high speed, low torque output for the generator 24. Additionally, as mentioned, the gearbox 36 may include multiple gears stages, with each gear stage increasing the input speed and decreasing the input torque. Moreover, the gearbox 36 includes an internal lubrication system (not depicted in FIG. 2) or other means for circulating oil to the various gears and components throughout the gearbox 36. As is generally understood, the lubricating oil is used to reduce friction between the moving components of the gearbox 36 and may also be utilized to provide cooling for such components, thereby decreasing component wear and other losses within the gearbox 36 and increasing the lifespan of the gearbox 36.

Additionally, as indicated above, a turbine controller 26 may also be located within the nacelle 16 of the wind turbine 10. For example, as shown in the illustrated embodiment, the turbine controller 26 is disposed within a control cabinet 38 mounted to a portion of the nacelle 16. However, in other embodiments, the turbine controller 26 may be disposed at any other suitable location on and/or within the wind turbine 10 or at any suitable location remote to the wind turbine 10.

Referring still to FIG. 2, any configuration of sensors 40 may be configured with the gearbox 36 for detecting, sensing and/or measuring one or more operating parameters and/or operating conditions of the drive train in general, and gearbox 36 in particular. These sensors 40 may be specifically suited for detecting, sensing, measuring, and/or controlling measuring one or more oil parameters of the gearbox 36. As used herein, the term "oil parameter" may refer to any characteristic and/or property that provides an indication of the operating state and/or condition of the oil contained within the gearbox 36 or oil supply system. For instance, in one embodiment, oil parameters may include, but are not limited to, oil temperature, oil viscosity, the number of particles and/or debris (e.g., metallic particles due to component wear) contained within the oil (referred to herein as "particle count"), the size of the particles and/or debris contained within the oil (referred to herein as "particle size") and/or the water content of the oil.

In general, the sensor(s) 40 may comprise any suitable sensors and/or other sensing devices known in the art for detecting, sensing and/or measuring one or more of the oil parameters of the gearbox 36. For example, to measure the oil temperature, the sensor(s) 40 may comprise one or more temperature sensors mounted through and/or disposed within the gearbox 36. Suitable temperature sensors may include, but are not limited to, thermocouples, thermometers, fiber optic temperature sensors, thermal imagers and/or the like. Similarly, to measure the oil viscosity, the sensor(s) 40 may comprise one or more viscosity sensors mounted through and/or disposed within the gearbox 36. For example, suitable viscosity sensors are known that perform temperature compensated viscosity measurements using capacitance and/or dielectric methods. Moreover, other suitable viscosity sensors are known that utilize micromechanical resonators and/or microacoustic devices, together with signal processing algorithms, to measure oil viscosity.

Further, as shown in FIG. 2, in certain embodiments, the oil supply system may include a separate dedicated controller 42 that is communicatively coupled to the turbine controller 26 to allow control and/or command signals to transmitted from the separate controller 42 to the turbine controller 26 and/or to allow signals/data received by the turbine controller 26 to be transmitted to the separate controller 42.

It should also be readily appreciated that the oil supply system functionalities may also be controlled by appropriate control algorithms within the overall turbine controller 26, or by the turbine controller 26 in combination with self-controlling devices, such as pre-set temperature mixing or flow control valves.

It should be appreciated that, in several embodiments of the present subject matter, the disclosed sensor(s) 40 may be communicatively coupled to the turbine controller 26 to permit signals corresponding to oil parameter measurements captured by the sensor(s) 40 to be transmitted to the turbine controller 26. Thus, in embodiments in which the turbine controller 26 is communicatively coupled to the separate controller 42, the signals received from the sensors 40 may then be transmitted to the separate controller 42 to allow for remote monitoring of the oil condition of the gearbox 36 and temperature control of the oil, as described in greater detail below. However, in alternative embodiments, the disclosed sensor(s) 40 may be directly coupled to the separate controller 42.

Figure 3:
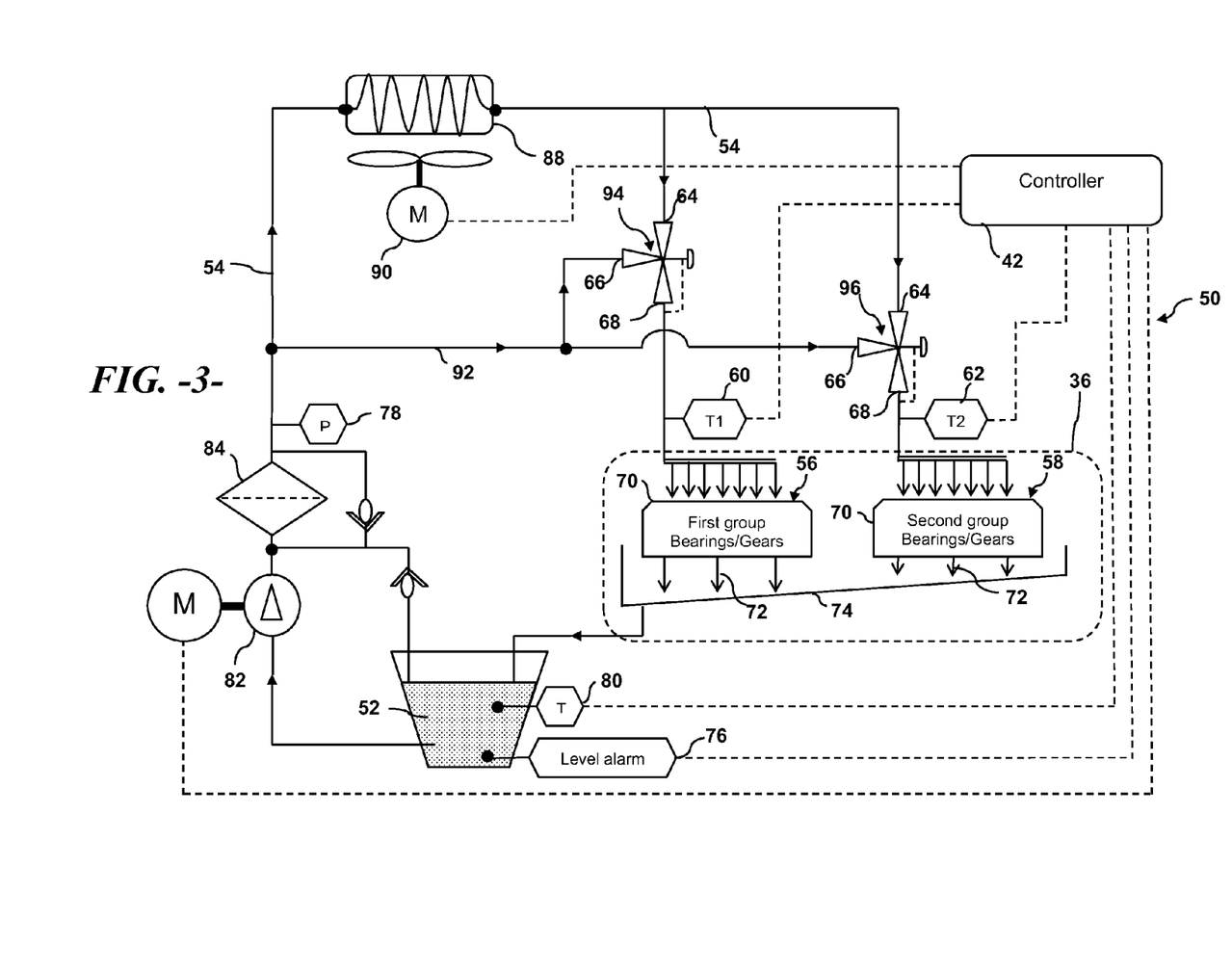
FIG. 3 illustrates a schematic diagram of one embodiment of an oil supply system for a wind turbine gearbox in accordance with aspects of the invention.
Figure 4:
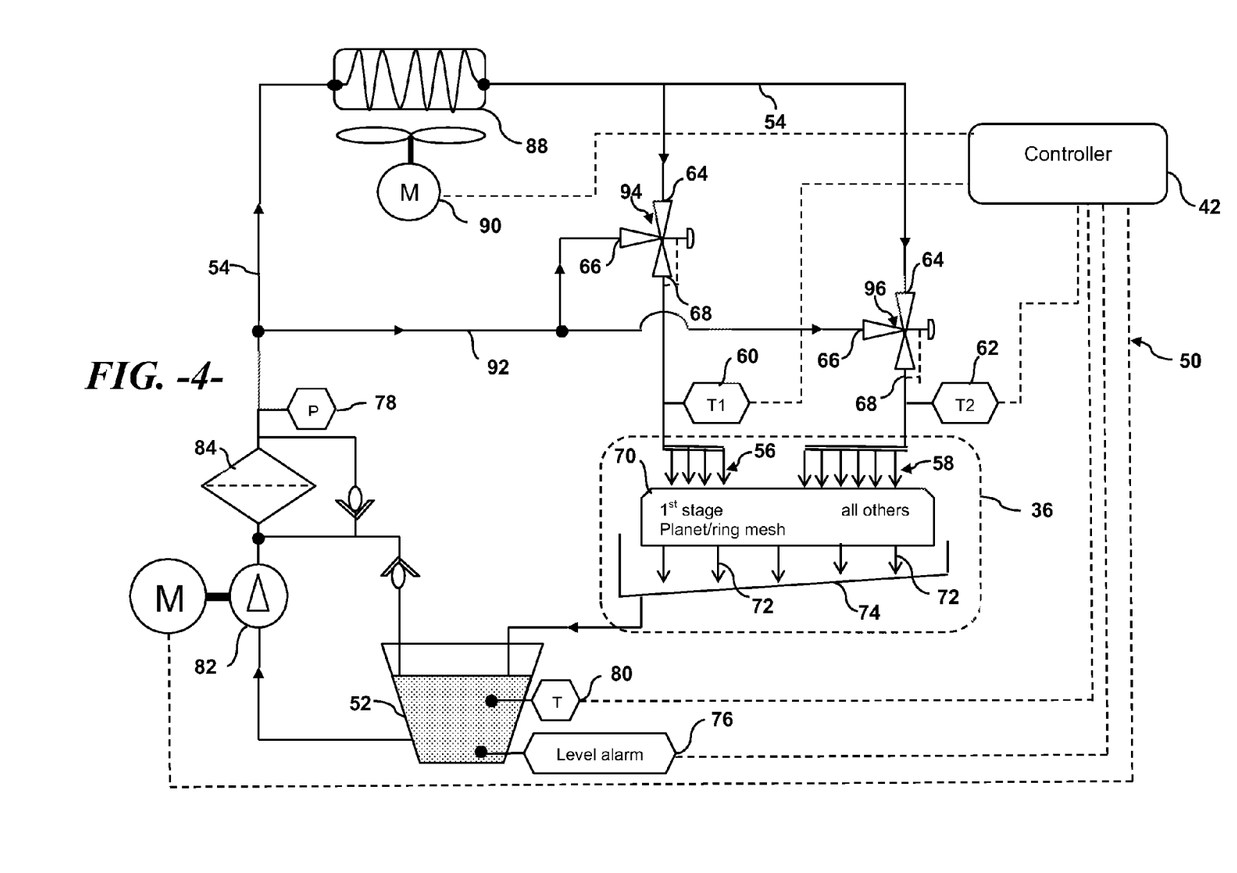
FIG. 4 illustrates a schematic diagram of an alternate embodiment of an oil supply system for a wind turbine gearbox in accordance with aspects of the invention.

Referring to FIGS. 3 and 4, a system 50 is depicted for supplying oil at different temperatures within a wind turbine gearbox 36. The different locations within the gearbox 36 may be variously defined. For example, referring to FIG. 3, separate gear stages 70 are represented, with each of these gear stages 70 including bearings, gears, or other components that are supplied with lubricating oil via the system 50. For example, a first group 56 of locations is depicted in FIG. 3 associated with a first gear stage(s) 70. This gear stage may include, for example, the first and second gear stages of the wind turbine gearbox 36. The second group of locations 58 may be associated with a separate gear stage 70, which may be the third gear stage for the gearbox 36.

In the embodiment of FIG. 4, the first group of gearbox locations 56 and second group of gearbox locations 58 are components within a single gear stage 70. For example, the first group of gearbox locations 56 may correspond to the sun/planet mesh gears wherein the lubricating oil has an optimum film thickness of about 0.11778 um, while the second group of gearbox locations 58 may correspond to the other gear meshes within the single gear stage wherein the oil film has an optimum thickness of about 0.02016 um. By controlling and varying the temperature of the oil delivered to these separate locations 56, 58, the viscosity of the oil can be controlled to achieve the desired oil film thicknesses within the same gear stage.

Referring to FIGS. 3 and 4 in general, the system 50 includes a common oil sump 50 in which the oil from the gearbox 36 is collected via the drains 72 associated with the separate gear stages 70 and collection pan 74. Any manner of temperature sensor 80 and level monitor/alarm 76 may be associated with the oil sump 50 and in communication with the controller 42 for any manner of control purpose.

A motorized supply pump 82 draws oil from the sump 50 and delivers the oil to the different gearbox locations 56, 58 via a common header 54. The supply pump may be operated by the controller 42. The "common header" 54 is understood to be any configuration of piping, lines, and common heat exchanger/cooler 88 operably configured between the pump 82 and the separate groups of gearbox locations 56, 58. In the embodiment depicted in FIGS. 3 and 4, the oil discharged from the pump 82 is filtered via any suitable filter system 84.

A pressure sensor 78 may be configured downstream of the filter system 84 to monitor the oil pressure in the main header 54. From the filter system 84, the oil is directed either to the common cooler 88, wherein the oil is cooled via a motor driven fan 90 or other suitable heat exchange mechanism. The fan 90 is controlled by the controller 42. A portion of the oil is also diverted to a bypass line 92 wherein the oil bypasses the cooler 88.

In the embodiment of FIG. 3, a first temperature control device is operably configured between the common header 54 and the first group of gearbox locations 56, and a second independent temperature control device is likewise configured between the common header 54 and the second group of gearbox locations 58. In a particular configuration, these temperature control devices are mixing valves 94, 96 having a first inlet 64 downstream of the discharge from the common cooler 88, and a second inlet 66 in fluid communication with the bypass line 92. The valves 94, 96 have an outlet 68 that discharges the oil to the respective location groups 56, 58, as schematically depicted in FIG. 3. Thus, the temperature control valves 94, 96 control the temperature of the oil (T1 and T2) delivered to the respective groups 56, 58 by controlling the mixing ratio of cooled oil from the discharge of the cooler 88 and uncooled oil from the bypass line 92.

In the particular embodiment illustrated in FIGS. 3 and 4, the temperature control valves 94, 96 are "passive" self-regulated devices that operate at a pre-set control temperature. These types of valves typically include a standard internal bi-metallic control element that senses oil temperature at the discharge side 68 of the valves. Any manner of suitable temperature-based sensor 60 is configured at the discharge of the first temperature control valve 94, and a similar temperature-based sensor 62 is configured at the discharge side of the second temperature control valve 96. These sensors 60, 62 monitor and alarm if the oil temperatures are not being properly maintained. The sensors 60, 62 may be, for example, any manner of suitable temperature sensor, as discussed above. In an alternate embodiment, the sensors 60, 62 may be temperature-compensated viscosity sensors that utilize capacitants and/or dielectric measurement techniques. As discussed above, other suitable viscosity sensors are known and may be used in this regard.

It should be readily appreciated that the temperature and/or viscosity of the oil delivered to the separate gearbox group locations 56, 58 may vary depending on any number of factors, including the operating conditions of the gearbox 36 and gear stages 70, the size and oil capacity of the gearbox 36, the material properties of the components contained within the gearbox 36, ambient air temperature conditions, historical data available regarding the wear and operation of the gearbox components 36, design considerations including optimum oil film thickness, and so forth. All of these factors may be taken into consideration in a control algorithm carried out by the controller 42.

Figure 5:
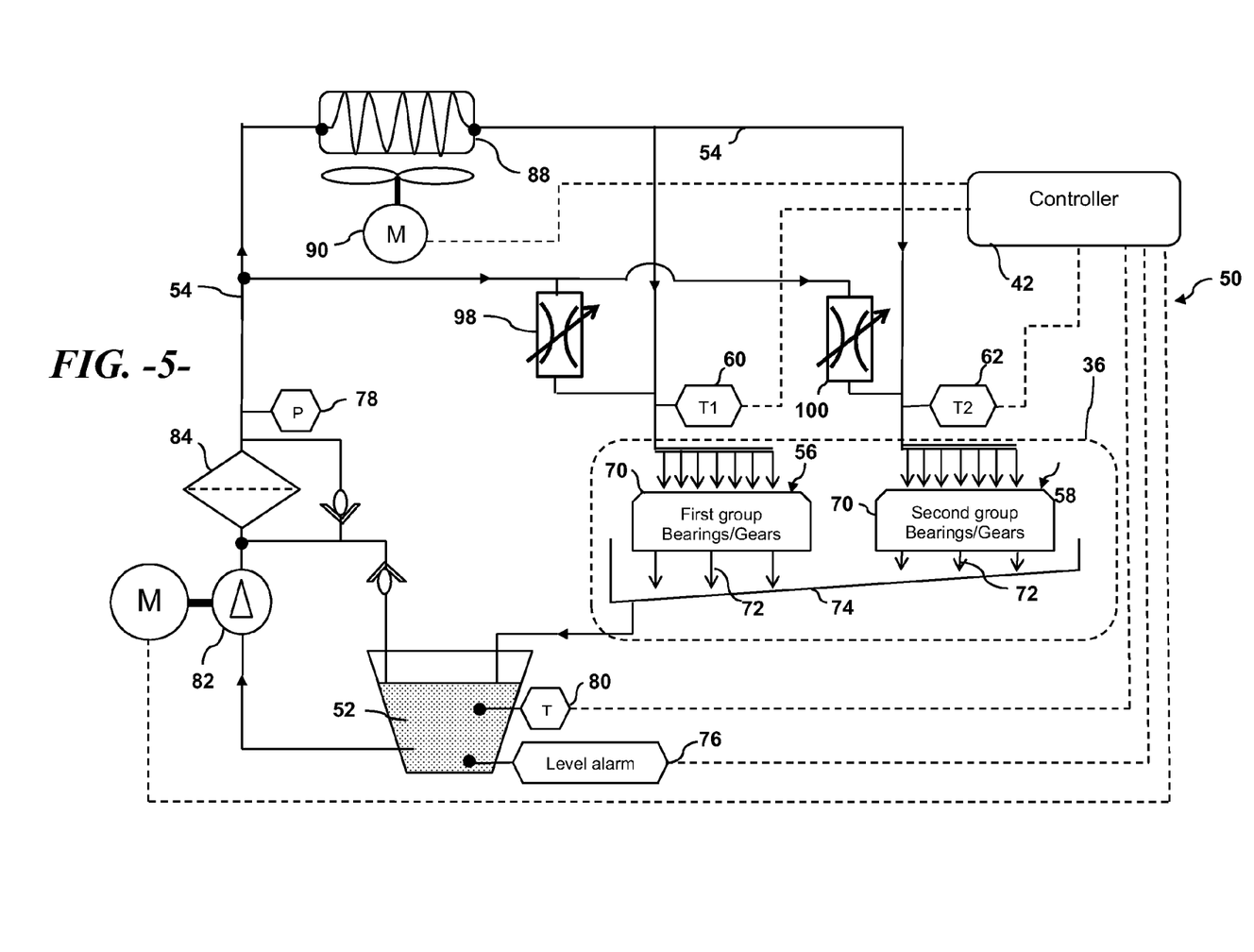
FIG. 5 illustrates a schematic diagram of yet another embodiment of an oil supply system for a wind turbine gearbox in accordance with aspects of the invention.

It should be appreciated that various oil lubrication configurations may be used to supply oil to the gearbox locations, and that the embodiments of FIGS. 3 and 4 are not limiting in this regard. For example, FIG. 5 illustrates an oil supply system 50 wherein, instead of mixing valves, the temperature control devices include first and second pre-set flow control valves 98, 100. The controller 42 varies the speed of the supply pump 82 and the cooler motor 90 to alter the temperature of the oil in the main feed line and the temperature of the oil coming out of the cooler 88 to augment, wherein the flow control vales 98, 100 control the oil flow from the main feed line. Although this system may not be as precise as the configuration of FIGS. 3 and 4, it may be more than sufficient for purposes of system 50.

In still a further embodiment not depicted in the figures, but similar to the system 50 of FIG. 3, the outlet from the first mixing valve 94 may also provide an inlet to the second mixing valve 96 (instead of a direct inlet from the main feed line to valve 96).

It should be appreciated that the present invention also encompasses a control method for supplying oil at different temperatures to different locations within a wind turbine gearbox 36, as generally discussed above. The method may include supplying oil from a common header 54 and common oil cooler 88 to a plurality of different locations 56, 58 within the wind turbine gear box 36. The method may include monitoring an inlet oil temperature-based parameter, such as temperature or viscosity of the oil, at the different locations 56, 58, and independently controlling the temperature of the oil supplied to the different locations as a function of the monitored inlet oil temperature-based parameter. This control may be accomplished by independently varying the flow of cooled oil from the common oil cooler 88 to each of the different locations. This may be accomplished by varying the flow of cooled oil via control valves associated with each of the different locations 56, 58, for example by controlling the mixing and/or flow of cooled oil and uncooled oil via flow control valves.

The method may include dividing the plurality of gearbox locations into a first group of one or more gear stages supplied with a first inlet oil temperature, and a second group of one or more different gear stages supplied with a second inlet oil temperature. In an alternative method configuration, the gearbox locations may be divided into a first group of components in a gear stage supplied with a first inlet oil temperature, and a second group of components in the gear stage supplied with a second inlet oil temperature, as discussed above with the embodiment of FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supplying oil at different temperatures to different locations within a wind turbine gearbox, comprising:
  a common oil sump;
  a supply pump disposed to draw oil from said sump and deliver the oil to said different gearbox locations via a common header;
  said different gear box locations divided into at least two groups, wherein each of said groups receives inlet oil at a respective inlet oil temperature (T1 for first group and T2 for second group);
  a first temperature control device disposed between said common header and said first group;
  a second temperature control device disposed between said common header and said second group;

wherein said first and second temperature control devices are configured to independently control the inlet oil temperature to said respective groups within said wind turbine gearbox an oil cooler disposed in said common header downstream of said supply pump, said first and second temperature control devices disposed downstream of said cooler and controlling a respective separate flow of oil from said cooler to the respective said first and second groups to independently control inlet oil temperatures T1 and T2;

said first group of gearbox locations comprising components in a first high speed gear stage and said second group of gearbox locations comprising components in a second low speed gear stage of said wind turbine gearbox; and wherein said first temperature control device is configured to supply inlet oil to said first high speed gear stage at temperature T1 that is greater than temperature T2 of inlet oil supplied to said second low speed gear stage by said second temperature control device.

2. The system as in claim 1, wherein said first and second temperature control devices are mixing valves having a first inlet from said cooler, and a second inlet from a cooler bypass line, wherein the inlet oil temperature is controlled by varying the degree of mixing of cooled oil from said cooler and uncooled oil from said bypass line.

3. The system as in claim 1., further comprising a first inlet oil temperature-based sensor configured with said first group, and a second inlet oil temperature-based sensor configured with said second group, said temperature control devices independently controlling oil temperature to said respective groups of gearbox locations as a function of sensed inlet oil temperatures from said oil temperature sensors.

4. The system as in claim 3, wherein said temperature-based sensors are in communication with a controller, said controller configured to vary the cooling rate of said cooler.

5. The system as in claim 4, wherein said controller is further configured to control flow rate of oil through said cooler.

6. The system as in claim 5, wherein said temperature control devices comprise mixing valves having a first inlet from said cooler, and a second inlet from a cooler bypass line.

7. The system as in claim 5, wherein said temperature control devices comprise flow control valves having an inlet from a cooler bypass line.

8. The system as in claim 1, wherein said first and second groups of gearbox locations comprise components within the same gear stage of said wind turbine gearbox.

\* \* \* \* \*